United States Patent Office 2,781,117
Patented Feb. 12, 1957

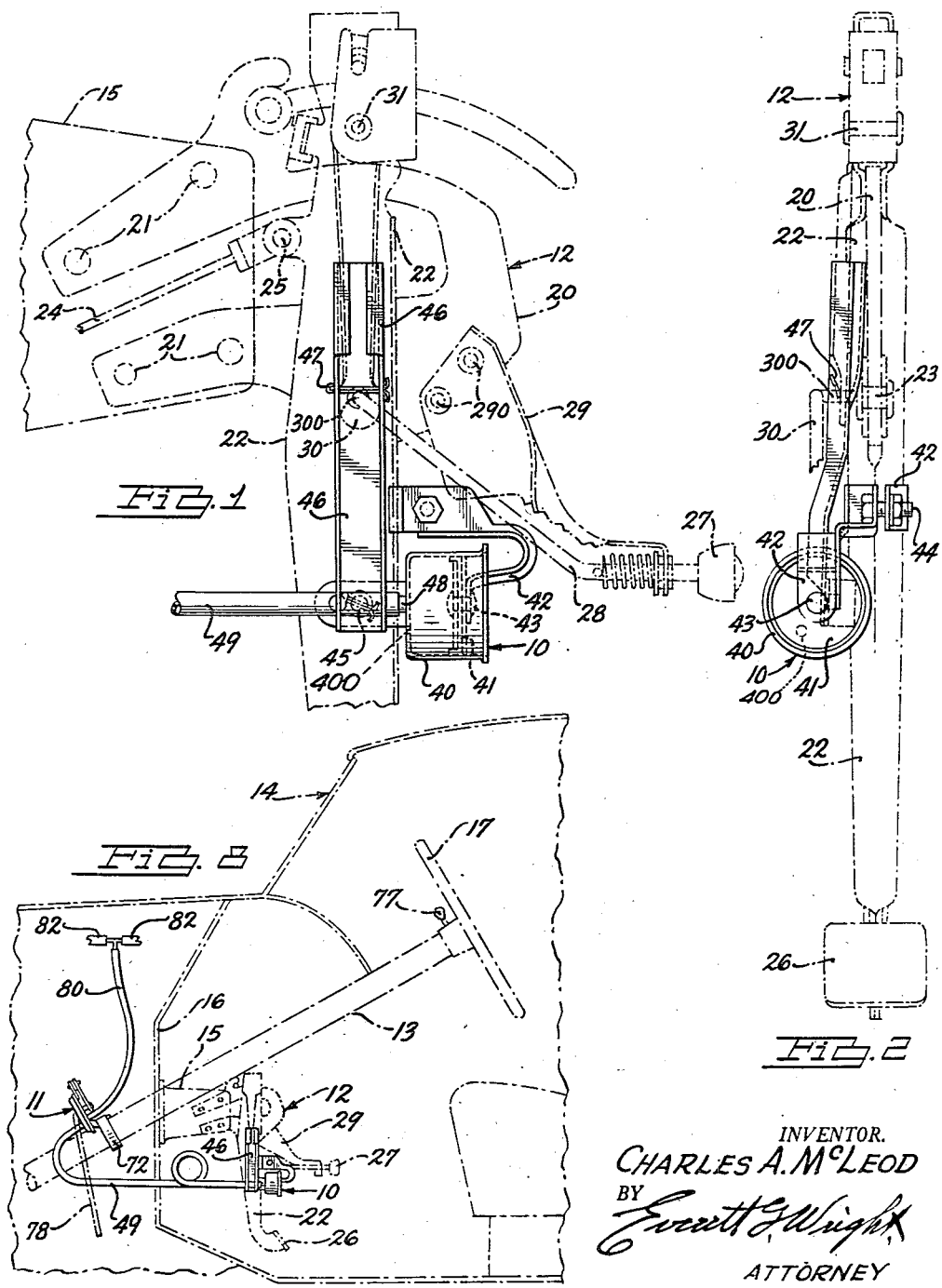

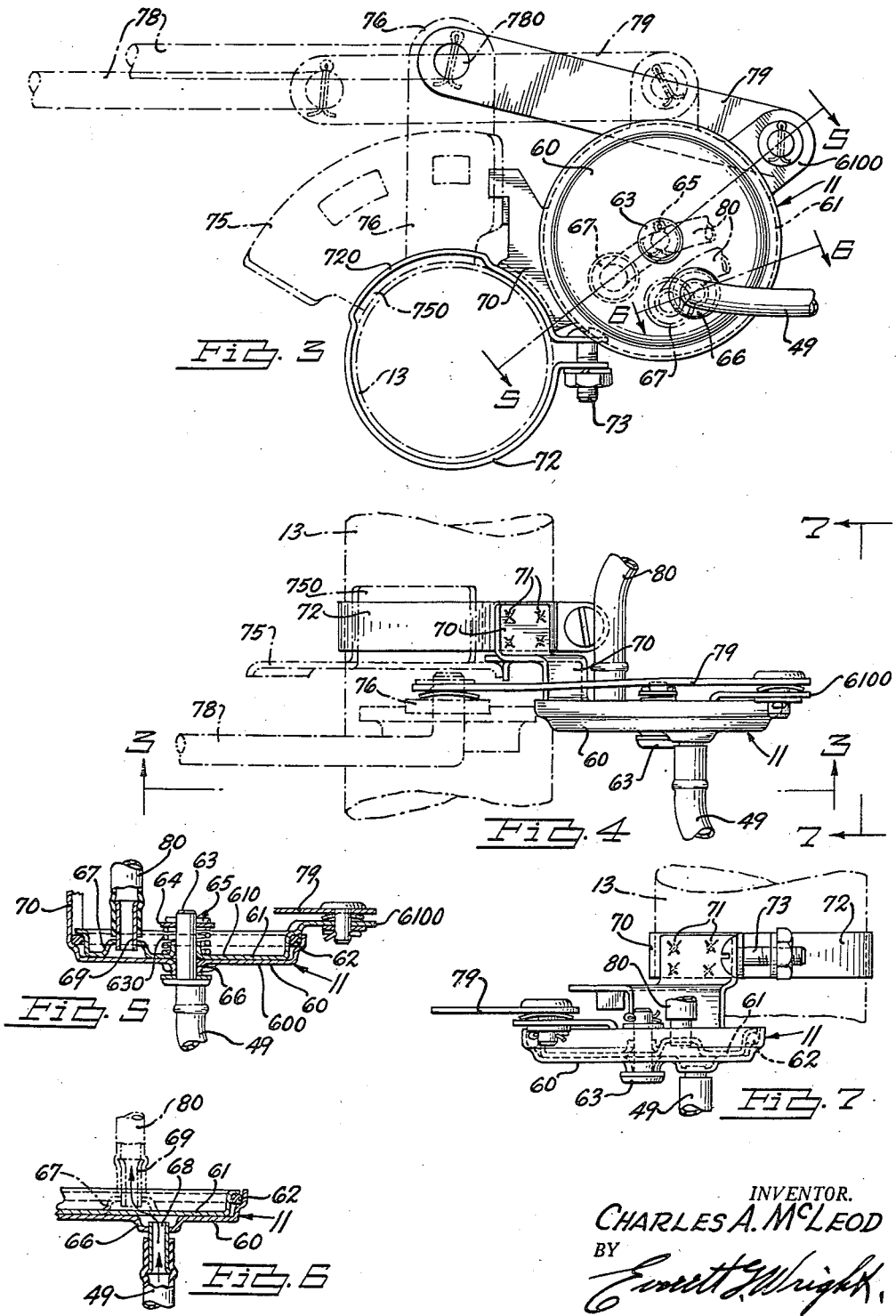

2,781,117

AUTOMATIC BRAKE RELEASE MECHANISMS

Charles A. McLeod, Birmingham, Mich., assignor to A. S. Campbell Co., Inc., a corporation of Massachusetts Application February 1, 1955, Serial No. 485,451

11 Claims. (Cl. 192—4)

This invention relates to automatic brake release mechanisms of the type usable in connection with the parking brake of the modern motor vehicle.

The modern motor vehicle is preferably provided with automatic transmissions of a type like or similar to the well known "Dynaflow," "Hydramatic" or "Power Glide" transmissions with which a speed range selector is employed. The operation of such automatic transmissions is generally controlled by a suitable lever operated selector mechanism with which the driver of the vehicle selects the desired speed range at which the vehicle will operate; for example, typical speed range settings may be P—parking, N—neutral, DR—drive, LO—low or R—reverse.

The driver of a motor vehicle usually applies and sets the "parking brake," or "hand brake" as it is ofttimes called, when the vehicle is not in use. The mechanism for applying the parking brake and holding it in its braking position takes many forms. Typical parking brake constructions with which the invention may be employed is disclosed in Patent No. 2,299,508 to Willard C. Skareen and in Patent No. 2,309,454 to Heller.

The primary object of the instant invention is to provide automatic release mechanism for use with hand brake or parking brake mechanisms to release the hand or parking brake automatically responsive to the movement of the vehicle speed range selector to any driving position, for example, DR—drive, LO—low or R—reverse. The invention is equally applicable whether the parking brake is applied and held through foot lever controlled parking brake mechanisms as shown in the herein identified Skareen or Heller patents or whether the parking brake is applied and held through other hand or foot operated parking brake mechanisms.

A further object of the invention is to provide automatic brake release mechanism that will release the parking brake of a motor vehicle responsive to the vehicle speed range selector being moved to any forward or reverse driving position only when the internal combustion engine of the vehicle is running.

Other objects of the invention will become apparent by reference to the following detailed description taken in connection with the accompanying drawings in which parking brake mechanism of the type disclosed in the referenced Heller and Skareen patents and other portions of a motor vehicle shown for the purpose of illustrating the application of the invention to a modern motor vehicle are shown in dot and dash lines so that the mechanism embodying the instant invention may be readily distinguished therefrom. In the drawings:

Fig. 1 is a side elevational view of an automatic brake release embodying the invention indicated in operating relationship with respect to a typical modern prior art parking brake mechanism.

Fig. 2 is a front elevational view of the construction shown in Fig. 1.

Fig. 3 is an elevational view of control valve mechanism preferably employed looking up the steering column of a motor vehicle equipped with the invention.

Fig. 4 is a top plan view of the construction shown in Fig. 3.

Fig. 5 is a sectional view taken substantially on the line 5—5 of Fig. 3.

Fig. 6 is a sectional view taken substantially on the line 6—6 of Fig. 3.

Fig. 7 is a side elevational view taken on the line 7—7 of Fig. 4.

Fig. 8 is a more or less diagrammatic locator view showing the relative locations of the elements of the invention when installed in a motor vehicle.

Referring now to the drawings wherein like reference numerals refer to like and corresponding parts throughout the several views, automatic brake release mechanism embodying the invention generally consists of a power unit 10 and a control valve unit 11, the said power unit 10 being shown installed on a typical parking brake mechanism 12 of the type disclosed in Patent No. 2,299,508 to Skareen and in Patent No. 2,309,454 to Heller, and the said valve unit 11 being shown installed on the steering column 13 of a motor vehicle 14. The said parking brake mechanism 12 is mounted by means of a bracket 15 to the fire wall 16 of the motor vehicle 14.

The parking brake mechanism 12 includes a support 20 which is secured by rivets 21 to bracket 15 by means of which it is mounted on the motor vehicle fire wall 16. The brake arm 22 is pivoted about the pivot 23. A parking brake cable 24 is anchored to the brake arm 22 at 25 so that, when the brake arm 22 is pivoted by foot pressure applied to the foot pedal 26 at the lower end thereof, the brake cable 24 is pulled taut and the parking brake is applied. Suitable means employed in the parking brake mechanism 12 locks the parking brake arm in its "brake-on" position from which it may be released manually by pulling the manual release knob 27 connected by brake release link 28 to the brake release lever arm 30 pivoted at 31 to a portion of the parking brake mechanism 12 (not shown) which holds the parking brake arm 22 to any position to which it is pivoted by the application of foot pressure on the pedal 26. The said brake release link 28 is supported by a bracket 29 riveted to the support 20 by the rivets 290, and is pivotally connected to the lower end of the brake release lever arm 30 at 300.

The power unit 10 of the brake release mechanism embodying the invention consists of a vacuum cylinder 40 into which a piston 41 is reciprocatingly mounted. The piston 41 is fixed to one end of a bracket 42 by a rivet 43, the other end of the said bracket 42 being clamped by means of a bolt 44 to the brake arm 22 as best shown in Figs. 1 and 2. The cylinder 40 is pivotally connected at 45 to an extension 46 to the brake release lever arm 30, which extension 46 is indicated as having its upper end formed to telescope over the brake release lever arm 30 and fixed thereto by means of a cotter pin 47 disposed above the point 300 at which the brake release link 28 is pivoted to the brake release lever arm 30. A suitable vacuum hose connection 48 is provided between the vacuum line 49 and the cylinder 40. With this construction, and by simple means, vacuum in the cylinder 40 moves the brake release lever arm 30 counter-clockwise around its pivot 31 to release the brake arm 22 so that the brake cable 24 may travel under tension applied thereto by means (not shown) to release the parking brake. Obviously, a breather aperture 400 is provided in the bottom of the cylinder 40 as shown in Figs. 1 and 2. The said breather aperture 400, according to conventional practice, is small enough to permit vacuum to build up in the cylinder 40 when applied thereto, and yet it is large enough to permit relief of vacuum in the said cylinder 40 after its function has been accomplished.

Although the power unit 10 including the vacuum cylinder 40 and the brake release lever arm extension 46 and related parts is shown to be an accessory readily mounted on the parking brake mechanism 12, it is obvious that the power unit 10 of automatic brake release mechanisms embodying the invention may be incorporated in the original production of many parking brake mechanisms of the general type referred to herein.

The control valve unit 11 is composed of a fixed cup shaped fixed valve element 60 and a turnable complementarily shaped cup valve element 61 nested into the fixed valve element 60 with an O-ring seal 62 disposed between the peripheral flanges thereof. The said turnable valve element 61 is turnably mounted on a central stud 63 extending through the centrally bossed flat circular portions 600 and 610 of the valve elements 60 and 61 respectively. The said valve elements 60 and 61 are held together with their central flat circular portions 600 and 610 in contact with each other by coil spring means 630 disposed around the stud 63 and held in place by a washer 64 and the cotter pin 65.

The fixed valve element 60 is outwardly bossed and apertured at 66 and has a vacuum hose nipple 68 welded or brazed thereinto while the turnable valve element 61 is outwardly bossed and apertured at 67 and has a vacuum hose nipple 69 welded or brazed thereinto. The fixed valve element 60 is provided with an integral bracket 70 which is welded at 71 to a clamp 72 secured by a bolt 73 around the steering column 13 of the motor vehicle 14. The said clamp 72 is offset at 720 to fit over the fixed flange 750 of the part 75 normally provided on the steering column 13 at the speed range control lever 76 which extends from and is moved arcuately in respect to the steering column 13, thus properly locating and orienting the control valve unit 11 onto the steering column 13. The speed range control lever 76 is moved arcuately responsive to manual movement of the speed range selector lever 77 usually mounted on the steering column 13 just below the steering wheel 17. Pivotally connected to the speed range control lever 76 is the automatic transmission control road 78. An automatic brake release valve link 79 is pivotally connected at one end to the end 780 of the automatic transmission control rod 78 and at its other end to an ear 6100 extending from the turnable valve element 61. With such construction the turnable valve element 61 is turned responsive to the movement of the manual speed range selector lever 77.

As indicated in the drawings, the bossed apertures 66 and 67 in the fixed and turnable valve elements 60 and 61 are so located as not to be in registry with each other as indicated in Fig. 5 whereby to maintain the control valve 11 closed when the speed range selector lever 77 is in one position and to become in registry as indicated in Fig. 6 when the speed range selector lever 77 is in a second position. The one position referred to is when the speed range selector lever 77 is moved to where the automatic transmission of the motor vehicle 14 is set in a P—parking or N—neutral position, and the second position referred to is when the speed range selector lever 77 is moved to a position where the automatic transmission of the motor vehicle 14 is set in a DR—drive or LO—low or R—reverse position.

A vacuum line 80 is provided from a T 81 in any available source of vacuum of the motor vehicle 14, for example, the vacuum line 82 which runs from the intake manifold of the engine to the windshield wiper, the said vacuum line 80 also being connected to the nipple 69 provided on the movable valve element 61. The vacuum line 49 connected to the brake release vacuum cylinder 40 is connected to the nipple 68 of the fixed valve element 60.

With the foregoing construction, the parking brake mechanism 12 may be operated manually in its normal manner to set or release the parking brake of the motor vehicle 14. Whenever the parking brake mechanism is set, and the engine of the motor vehicle 14 is not running, no action is had from the automatic brake release mechanism 10—11 regardless of where the speed range selector lever 77 is set or to what position it may be moved.

If the parking brake mechanism 12 is set to apply the parking brake, and the speed range selector lever 77 is in a P—parking or N—neutral position where it must be to start the engine in all modern motor vehicles incorporating automatic transmissions, the starting of the engine does not release the parking brake. However, with the engine running, movement of the speed range selector lever 77 to any drive position such as DR—drive, LO—low or R—reverse will immediately release the parking brake mechanism 12 by the application of vacuum through the control valve unit 11 to the vacuum power cylinder 40 which moves the parking brake release lever 30 sufficiently to permit the brake arm 22 to pivot to its "off" position under tension from the usual spring means associated with the parking brake which constantly urges it to its "off" position.

Although but a single embodiment of the invention has been disclosed and described in detail, it is obvious that many changes may be made in the size, shape, arrangement and detail of the several elements thereof to accommodate it to various motor vehicles and parking brake constructions, all without departing from the spirit and scope of the invention as defined by the appended claims.

I claim:

1. In an automatic parking brake release for use with a motor vehicle having an automatic transmission and speed range selector means, an engine providing a source of vacuum when running, and a parking brake mechanism including a spring loaded brake arm and a brake release lever adapted to set and release said parking brake comprising a vacuum power unit connected to said vacuum source fixed in respect to said brake arm and operatively connected to said brake release lever, and valve means operable responsive to shifting the automatic transmission of the vehicle to any "drive" position applying vacuum to said power unit whereby to move said brake release lever and release said parking brake.

2. In an automatic parking brake release for use with a motor vehicle having an automatic transmission and speed range selector means therefor, an internal combustion engine providing a source of vacuum when running, and a parking brake mechanism including a spring loaded brake arm and a brake release lever adapted to be set and released to apply and release said parking brake comprising a vacuum power unit connected to said vacuum source fixed in respect to said brake arm and operatively connected to said brake release lever, and valve means mounted on said steering column and linked to said transmission speed range selector means operable responsive to setting the speed range selector means to any "drive" position whereby to apply vacuum to said power unit to move said brake release lever and release said parking brake only when said vacuum is available through the operation of the engine.

3. In an automatic parking brake release mechanism for use with a motor vehicle having an automatic transmission and speed range selector means, an engine providing a source of vacuum when running, and a parking mechanism including a spring loaded brake arm and a brake release lever adapted to set and release said parking brake, said brake release mechanism comprising a vacuum power unit composed of a cylinder connected to said vacuum source fixed in respect to said brake arm and a piston operatively connected to said brake release lever for moving the same, and means interposed in the vacuum connection between said cylinder and said vacuum source operable responsive to a manual setting of the speed range selector means of said automatic transmission to any "drive" position applying vacuum to said power unit only when said engine is running whereby to move said brake release lever and thereby release said parking brake.

4. In an automatic parking brake release for use with a motor vehicle having an automatic transmission and speed range selector means, an engine providing a source of vacuum when running, and a parking brake mechanism including a spring loaded brake arm and a brake release lever adapted to set and release said parking brake comprising a vacuum power unit connected to said vacuum source fixed in respect to said brake arm and operatively connected to said brake release lever, and a valve linked to said transmission speed range selector means operable responsive to shifting the automatic transmission speed range selector means to any "drive" position applying vacuum to said power unit whereby to move said brake release lever and release said parking brake.

5. In an automatic parking brake release for use with a motor vehicle having an automatic transmission and a speed range selector coupled thereto, an engine providing a source of vacuum when running, and a parking brake mechanism including a brake release lever adapted to release said parking brake comprising a vacuum power unit connected to said vacuum source fixed in respect to said brake arm and operatively connected to said brake release lever to move the same and release said parking brake, and valve means linked to said speed range selector operable responsive to shifting the said speed range selector to any "drive" position.

6. In an automatic parking brake release for use with a motor vehicle having an automatic transmission and speed range selector means, an engine, a source of vacuum available only when said engine is running, and a parking brake mechanism including a brake release lever adapted to release said parking brake when set comprising a vacuum power unit connected to said vacuum source fixed in respect to said brake release lever and operatively connected thereto to move the same, and valve means linked to and operable responsive to shifting the speed range selector means of the automatic transmission to any "drive" position whereby to apply vacuum to said power unit and move said brake release lever to release said parking brake.

7. In an automatic parking brake release mechanism for use with a motor vehicle having an automatic transmission and speed range selector means therefor, an internal combustion engine providing a source of vacuum when running, and a parking brake mechanism including a brake release lever adapted to release said parking brake, said parking brake release mechanism comprising a vacuum power unit connected to said vacuum source composed of a cylinder fixed in respect to said brake release lever and a piston connected thereto, and valve means comprising a fixed element mounted on said steering column and a movable element linked to said speed range selector means operable responsive to setting the speed range selector means in any "drive" position to apply vacuum to said cylinder to move said brake release lever and release said parking brake.

8. In an automatic parking brake release for use with a motor vehicle having an automatic transmission and a manually operable speed range selector means therefor, an internal combustion engine providing a source of vacuum when running, and a parking brake mechanism including a brake release lever adapted to release said parking brake comprising a vacuum power unit connected to said vacuum source fixed in respect to said brake release lever and operatively connected thereto to move the same and release said parking brake, and nested cup type valve means including a fixed cup element mounted on said steering column and a turnable cup element linked to said transmission speed range selector means, each of said fixed and turnable valve elements having chambers therein normally blocked by the other valve element permitting vacuum flow through said valve when the turnable valve element is turned to place said chambers in communication, said turnable cup element being turnable responsive to setting the speed range selector means to any "drive" position whereby to apply vacuum to said power unit to move said brake release lever and release said parking brake.

9. In an automatic parking brake release mechanism for use with a motor vehicle having an automatic transmission and speed range selector means, an engine providing a source of vacuum when running, and a parking mechanism including a spring loaded brake arm and a brake release lever adapted to release said parking brake arm comprising a vacuum power unit composed of a cylinder connected to said vacuum source fixed in respect to said brake arm and a piston reciprocably mounted in said cylinder operatively connected to said brake release lever for moving the same, and normally closed valve means interposed between said vacuum cylinder and said vacuum source opened responsive to the manual setting of the speed range selector means to any "drive" position whereby to apply vacuum to said power unit and move said brake release lever to release said parking brake.

10. In combination with a parking brake of a motor vehicle having an automatic transmission and speed range selector means, an engine providing a source of vacuum when running, a spring loaded parking brake arm, and a brake release lever adapted to release said parking brake lever, a vacuum power unit composed of a cylinder and normally closed valve means connected to said vacuum source, said cylinder being fixed in respect to said brake arm, and a piston reciprocably mounted in said cylinder connected to said brake release lever for moving the same, and linkage means between said valve means and said speed range selector means of said automatic transmission adapted to open said valve when said speed range selector means is moved to any "drive" position and apply vacuum from said vacuum source to said power unit whereby to move said brake release lever and thereby release said parking brake arm and brake.

11. In an automatic parking brake release mechanism for a manually set spring loaded release parking brake mechanism for automative vehicles including a source of vacuum and an automatic transmission operable by a speed range selector means, said parking brake mechanism including a brake setting lever and means releasably locking said brake lever in its manually "set" position, a vacuum power unit connected to said vacuum source and linked to said means releasably locking said brake lever in its "set" position, normally closed valve means interposed between said vacuum source and said power unit operable responsive to setting the said speed range selector means to any "drive" position whereby to apply vacuum to said vacuum power unit and release said parking brake.

References Cited in the file of this patent

UNITED STATES PATENTS

| 2,070,266 | Freeman | Feb. 9, 1937 |
| 2,217,230 | Morphet | Oct. 8, 1940 |